United States Patent [19]
Bouton

[11] Patent Number: 5,368,785
[45] Date of Patent: Nov. 29, 1994

[54] ANTI-FREEZING DEVICE FOR CROSS-FLOW TOWER COOLERS

[75] Inventor: Franz M. F. G. Bouton, Soignies,

[73] Assignee: Hamon-Sobelco S.A., Brussels,

[21] Appl. No.: 64,663

[22] Filed: May 21, 1993

[30] Foreign Application Priority Data

May 27, 1992 [BE] Belgium ..................... 09200495

[51] Int. Cl.⁵ ................................................ B01F 3/04
[52] U.S. Cl. .............................. 261/111; 261/DIG. 11
[58] Field of Search ................. 261/110, 111, DIG. 11

[56] References Cited

U.S. PATENT DOCUMENTS

| | | | |
|---|---|---|---|
| 1,334,515 | 3/1920 | Braun | 261/110 |
| 2,512,271 | 6/1950 | Green | 261/111 |
| 2,776,121 | 1/1957 | Fordyce | 261/111 |
| 3,115,534 | 12/1963 | Bottner | 261/24 |
| 3,268,217 | 8/1966 | Goitein | 261/110 |
| 3,917,764 | 11/1975 | Phelps | 261/111 |
| 4,105,723 | 8/1978 | Mix | 261/110 |

FOREIGN PATENT DOCUMENTS 1163933 10/1958 France .
2279049 2/1976 France .

*Primary Examiner*—Tim Miles

[57] ABSTRACT

The invention relates to tower coolers in which the exchange of heat between the liquid to be cooled and the atmospheric air takes place in cross-flow, in plural successive heat exchangers. Liquid leaving a first exchanger is homogeneously mixed before passing to the next exchanger. This may be effected by a device comprising a first compartment sited beneath a first exchanger so as to receive the liquid which falls from said first exchanger. A spillway is placed at one end of said compartment in such a manner that the liquid is displaced therein in a first direction, either that of the airflow or the reverse direction. A second compartment is placed beneath the first and communicates therewith via the spillway such that the liquid is displaced therein in a second direction opposite to the first. Means are provided for discharging the liquid from the second compartment toward the following exchanger.

5 Claims, 4 Drawing Sheets

ANTI-FREEZING DEVICE FOR CROSS-FLOW TOWER COOLERS

BACKGROUND OF THE INVENTION

The present invention relates to tower coolers designed to cool, by direct contact with the atmospheric air, a liquid, particularly water, falling under the effects of gravity through an exchanger through which the flow of atmospheric air passes approximately horizontally. In this type of cooler, the exchange between the air and the liquid therefore involves cross-flows more particularly the invention relates to an anti-freezing device for this type of cooler.

Examples of the foregoing type of cooler are those disclosed in FR 2 593 902 (EDF—cross-flow cooler with natural draught), U.S. Pat. No. 3,389,895 (De Flon—cross-flow cooler with mechanical draught and splash slats), U.S. Pat. No. 4,020,130 (Ovard—similar to the latter), U.S. Pat. No. 4,320,073 (Marley—exchanger for a cross-flow, film-type cooler with mechanical draught). The water can actually trickle through the exchanger in a film (film trickling), in droplets ("splash" trickling) as the result of the water striking the elements of the exchanger, or else in any other intermediate or combined form of film trickling and droplet trickling.

When the ambient temperature is below 0° C. the water is in danger of freezing, and this must be avoided at all costs inside the cooler, particularly anywhere in the exchanger.

This is because the formation of blocks of ice can cause elements of the exchanger, or even of the structure supporting it, to fracture. On the other hand, when the ambient temperature rises again, the thawing of blocks of ice, beginning in the upper part, will cause these to fall and this could produce substantial damage.

As a result, the designers and operators of tower coolers have constantly sought to delay, reduce and control ice formation.

In this connection the following patents taken out by the Applications themselves may be cited: FR 2 266 134, EP-B 54 843, EP-B 58 109, EP-B 264 316 and FR 2 658 906, as well as EDF's patent FR 2 593 902.

One means frequently employed involves reducing the thermal exchange efficiency by increasing the flow of water locally, whether at the periphery (FR 2 266 134 and FR 2 658 906), at the centre (EP 54 843), or over one sector (FR 2 593 902), and by reducing or even interrupting it elsewhere.

This reduction of thermal efficiency may also be obtained by restricting the airflow, either by artificial means (EP 264 316) or even by ice formation (EP 58 109), suitably controlled (outside the exchanger in the air intake ports). Lastly, efficiency reduction may be obtained by distributing at least some of the hot water that is to be cooled at an intermediate level of the exchanger.

The precautions against freezing must already have been taken before the means temperature of the cooled water approaches zero degree centigrade, because the temperature of the water is not constant throughout the depth of the exchanger, in other words between the external edge of the cooler and the centre of the cooler, essentially owing to the cross-flow exchange.

In the counter-flow coolers this lack of uniformity is insignificant because the counter-flow exchange of the exchanger does not generate differences in cooling, the lack of uniformity merely coming from the water droplets exiting beneath the exchanger, which are cooled by the air entering the cooler before proceeding gradually through the latter by counter-flow.

Conversely, cross-flow coolers are essentially characterised by two-dimensional temperature distribution: in the height direction and in the depth direction of the exchanger.

The temperature profile of the water up the height of the exchanger varies from the front surface of the exchanger where the water is everywhere cooled directly by the atmospheric air, to the rear surface where the water is cooled by reheated air in a non-uniform manner depending on the height of the exchanger; this air is in fact heated to a greater degree the higher up it is in the exchanger, that is to say the closer it is to the hot water supply.

The further away one gets from the hot water distribution platform, that is to say the further the water falls, the greater becomes the temperature difference—being zero at the top of the exchanger—between the water at the front surface and at the rear surface, and in the case of modern industrial coolers said difference is greatest either at the foot of the exchanger or slightly thereabove. The difference in temperature from front to back decreases after attaining a maximum value, because water cooling is limited to the temperature of the air (as shown on a wet bulb thermometer).

For example, for a given industrial cooler, involving water splashing onto gratings across spacings, a 15 K cooling difference (the difference between the temperature of the hot water and the mean temperature of the cold water) and a 10 K cooling approximation (the difference between the mean temperature of the cold water and that of the atmospheric air at the wet bulb), the difference in the water temperature on the same horizontal plane between the rear surface of the exchanger and the front surface passes through a maximum of around 16 K and ends at the water collecting basin with a still very high value of around 14 K, corresponding to an 8 K temperature difference between the mean temperature of the cold water and that of the coldest water.

The difference in water temperature between the front surface and the rear surface may be greater than the cooling difference within the cooler!

In another example of an industrial cooler constituted by four tiers of exchanger/film "packings", the temperature difference of the water between the rear and front surfaces is as follows:

| | |
|---|---|
| above the first, uppermost tier (hot water supply) | zero |
| between the first and second tiers | 6.6K |
| between the second and third tiers | 10.3K |
| between the third and fourth tiers | 12.4K |
| at the foot of the fourth tier (basin) | 13.3K |

But the temperature of the water on the same horizontal plane (corresponding to the airflow) does not vary linearly from the front surface to the rear surface. The difference between the mean temperature of the water and the lowest water temperature (at the front surface) is generally more than half the difference in the temperatures of the water between the rear and the front of the exchanger. In the last example cited, the difference between the mean temperature underneath the exchanger and the lowest temperature is 8.3 (>13.3/2).

It will therefore be seen that there is already a danger with cross-flow coolers of local ice formation whilst the mean temperature of the cold water is nearly 10° C.

It is therefore the object of the invention to reduce variation in the temperature of the water at one or more intermediate levels of the waterfall through the exchanger, in order to reduce the difference between the mean temperature of the water and the temperature of the coldest water, which is at the front of the exchanger.

Once, as the water is falling, a level is reached at which the lowest temperature of the water (at the front surface) would be less than the mean temperature of the cold water in the cooler, it is clearly desirable to make uniform the temperature of the water at that level, so as to allow the water to be cooled to a mean temperature closer to zero degree without risk of freezing in the front portion at the foot of the cooler.

SUMMARY OF THE INVENTION

According to the invention in one aspect there is provided a method of reducing variation in the temperature of a liquid in a tower cooler designed to cool, by direct contact with the atmospheric air, a liquid falling under the effects of gravity through at least two exchangers through which an atmospheric airflow passes approximately horizontally, wherein the liquid leaving a first said exchanger is subjected to a substantially homogeneous mixing or agitating operation, before passing into the following exchanger.

According to the invention in a second aspect there is provided a device for reducing variation in the temperature of a liquid in a tower cooler designed to cool, by direct contact with the atmospheric air, a liquid falling under the effects of gravity through at least two exchangers through which an atmospheric airflow passes approximately horizontally, characterised by means, provided beneath a first exchanger for effecting substantially homogeneous agitation or mixing of the liquid before it passes into the following exchanger.

In further aspects the invention provides a cross-flow tower cooler, including a variation reducing device; and a method of cooling a liquid by means of such a cooler.

It will be quite apparent that the means for reducing variation in temperature at a level entails capital costs both inherently and because of the increase in the height of the cooler by virtue of the specific thickness of this additional device. It may therefore be judicious to install a lesser number of such devices than the maximum number possible.

Accordingly, in the case of droplet-type trickling exchangers constituted by a plurality of levels of gratings over spacings, it is possible to provide one variation reducing device and a plurality of levels of gratings over spacings between the hot water distribution level and said variation reducing device, and between the latter and the foot of the exchanger. If two variation reducing devices are provided, there would be a plurality of levels of gratings over spacings interposed between the two devices.

Particularly in the example of the four-tiered cooler mentioned as the second example above, it would be feasible to install three variation reducing devices respectively below the first, second and third tiers, or else two variation reducing devices, respectively below the second and third tiers, or alternatively a single variation reducing device, which may be sited either between the second and the third tiers or below the third tier.

In the case of a single variation reducing device between the second and third tiers, the temperature difference between the front and rear of the exchanger is 7.9 K at the bottom of the exchanger. In the case of variation reducing devices between each tier (three devices), the difference is then 4.4 K. Obviously there would be the same temperature difference with a single device upstream of the fourth tier or with two devices installed respectively between the second and third tiers and between the third and fourth tiers.

By having a second device, or second and third devices, it becomes possible to reduce the temperature intervals at the exit from the third tier or from the second and third tiers, and hence to reduce the danger of freezing at the bottom of these tiers on their front (air intake) surface.

The invention will now be described with reference to the accompanying drawings.

DESCRIPTION OF THE PREFERRED EMBODIMENTS

Figure 1:
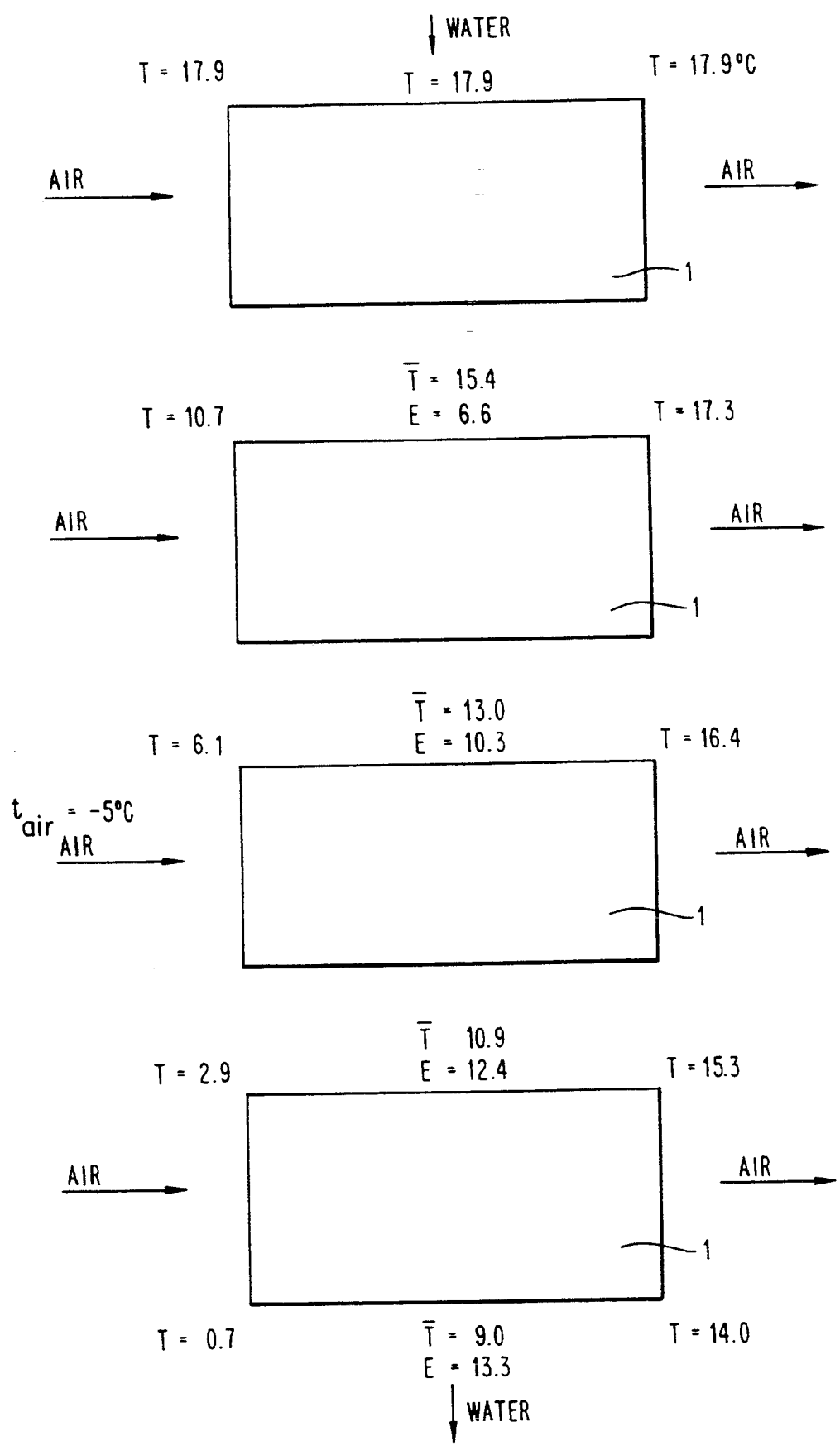
FIG. 1 is a diagram showing temperature distribution in an industrial cooler without a variation reducing device.

FIG. 1 illustrates what has been stated previously in the case of an industrial cooler constituted by four tiers of exchanger/film "packings", each designated by reference numeral 1, cooling the water from 17.9° to 9° C. $\overline{T}$ designates the mean temperature of the water at the entrance to and exit from the packings, and T designates the local temperature of the water. The incoming airflow is at $-5°$ C. ($t_{air} = -5°$ C.). The situation is illustrated in the absence of any variation reducing device and is intended to show the non-linear variation in water temperature over the same horizontal plane, corresponding to the airflow (arrows topped by the word "air") passing from the front surface to the rear surface of the exchanger, whereas the water flow is represented by the vertical arrows, since "cross-flow" exchange is concerned. Accordingly, considering the lower tier, the difference ($\Delta = 8.3$) between the mean water temperature ($\overline{T} = 9.0$) and the lowest water temperature (T=0.7 at the front surface) is more than half the difference $\epsilon$ in the water temperatures between the rear and the front of the exchanger (i.e. greater than $$\frac{\epsilon}{2} = \frac{14.0 - 0.7}{2}).$$

This example also illustrates the risk of ice formation while the mean temperature of the cold water is still at nearly 10° C.

Figure 2:
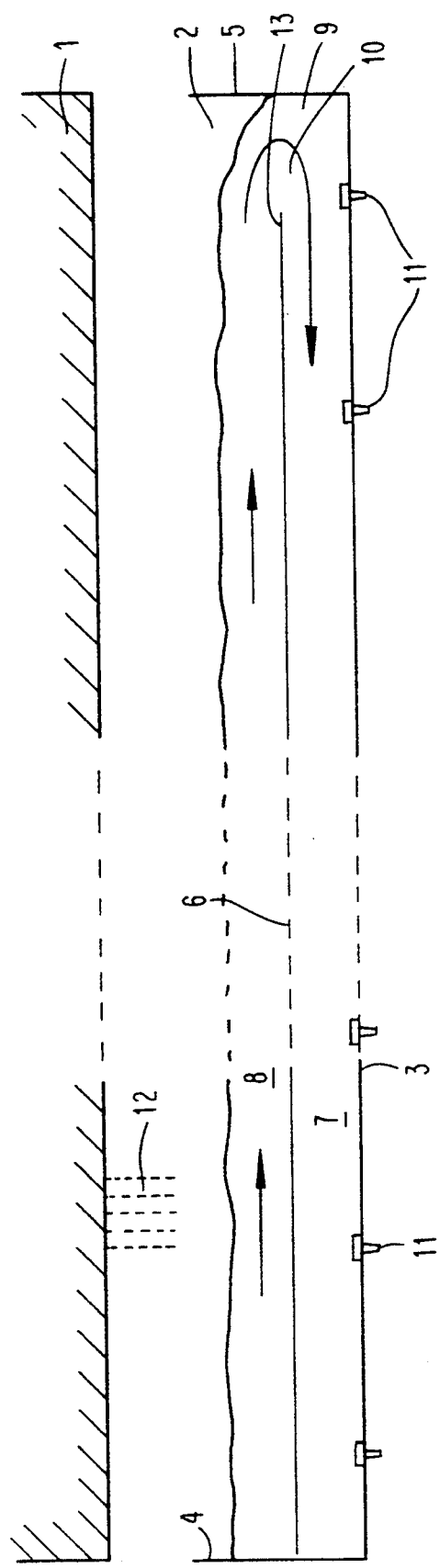
FIG. 2 illustrates an example of a variation reducing device which for instance can be interposed in a cooler depicted diagrammatically in FIG. 1.

In FIG. 2, reference numeral 1 designates an exchanger element, i.e. either a layout of gratings across spacings, where "droplet" type trickling is involved, or else a tier of "packings" in the case of film-type trickling.

The variation reducing device is positioned between the aforesaid element and a second similar element (not shown). It consists of a tank 2 extending the entire crosssection of the exchanger and comprising a perforated bottom 3, a front wall 4, a rear wall 5, side walls, and an intermediate bottom 6 dividing the device into a lower compartment 7 and an upper compartment 8. The water from the upper compartment passes through an opening 10 into the lower compartment in the form of an overflow 9. The bottom 3 is perforated by calibrated nozzles 11 which allow the water to pass from the lower compartment. If necessary, structural and stiffening members are also provided (not shown).

Reference numeral 12 designates the rain of water droplets falling from the exchanger 1 into the tank 2.

In the case illustrated, the intermediate bottom 6 is joined in leakproof manner to the side walls and to the front wall of the tank 2. It terminates at a distance from the rear wall and thereby delimits the opening 10. The rear edge 13 of the intermediate bottom 6 acts as a spillway.

In the example depicted, the lower compartment is completely filled with water. The spillway is thus of submerged weir or nappe type, which is the most attractive option if it is desired to reduce by the maximum amount the space taken up by the device.

However, a device would also be feasible in which the volume of water in the lower compartment has a free surface. In this case the spillway is of free nappe type. This option is less desirable by reason of the air cushion that remains in the lower compartment.

In actual fact to reduce the height of the cooler and make the variation reducing device as lightweight as possible it is necessary for the water in the compartments to be as shallow as possible whilst at the same time ensuring that the water is distributed uniformly to the exchanger below the device concerned.

The water level in the upper compartment depends on the specific flow to be discharged and on the depth of the exchanger. The length of the intermediate bottom may be less than or equal to the depth of the exchanger. In the former case, the difference corresponds to the width of the spillway at most. In the second case, the length of the lower bottom exceeds the depth of the exchanger, by a distance equal to the spillway opening.

The water level in the lower compartment is determined by the specific flow to be discharged and by the diameter and number of nozzles in the perforations in the bottom 3.

Said nozzles 11 are very numerous in comparison to the number of jets necessary for distributing water to the upper part of the exchanger from the upper basin or distribution platform of the cooler. This is because at this location the water level must be sufficient to enable good distribution of the water throughout the basin from one or a very small number of water inlet points. Conversely, in the lower compartment of the variation reducing device, the water enters across the whole width of the exchanger and the number of discharge jets may therefore be substantially higher than in the upper part of the exchanger, taking into account that the level of water in said compartment must be as shallow as possible.

The height of water above the bottom of the lower compartment is in the order of 5 to 10 cm.

Taking account of the level of water above the intermediate bottom, of the thicknesses of the bottoms and of a guard height to avoid overflowing, the intermediate device would be between 10 cm and 30 cm thick, depending on the specific flow and the depth of the exchanger.

The opening in the intermediate bottom incorporating the spillway is for example 10 cm.

In the example illustrated in FIG. 1, the spacing between tiers has been exaggerated to include mention of the water temperatures. Each tier has a height of for example 50 cm to 1.5 m, whilst the spacing between tiers, in the absence of an intermediate water redistribution device, may be zero if the tiers rest one on top of the other, or may correspond to the thickness of a system of supports (girders).

If variation reducing devices (or devices for redistributing the water) are interposed between the tiers, the interval between tiers will then be increased by the actual thickness of each device, the latter being positioned either on girders or some other suitable support, or else suspended beneath the exchanger from which it receives the water.

Figure 3:
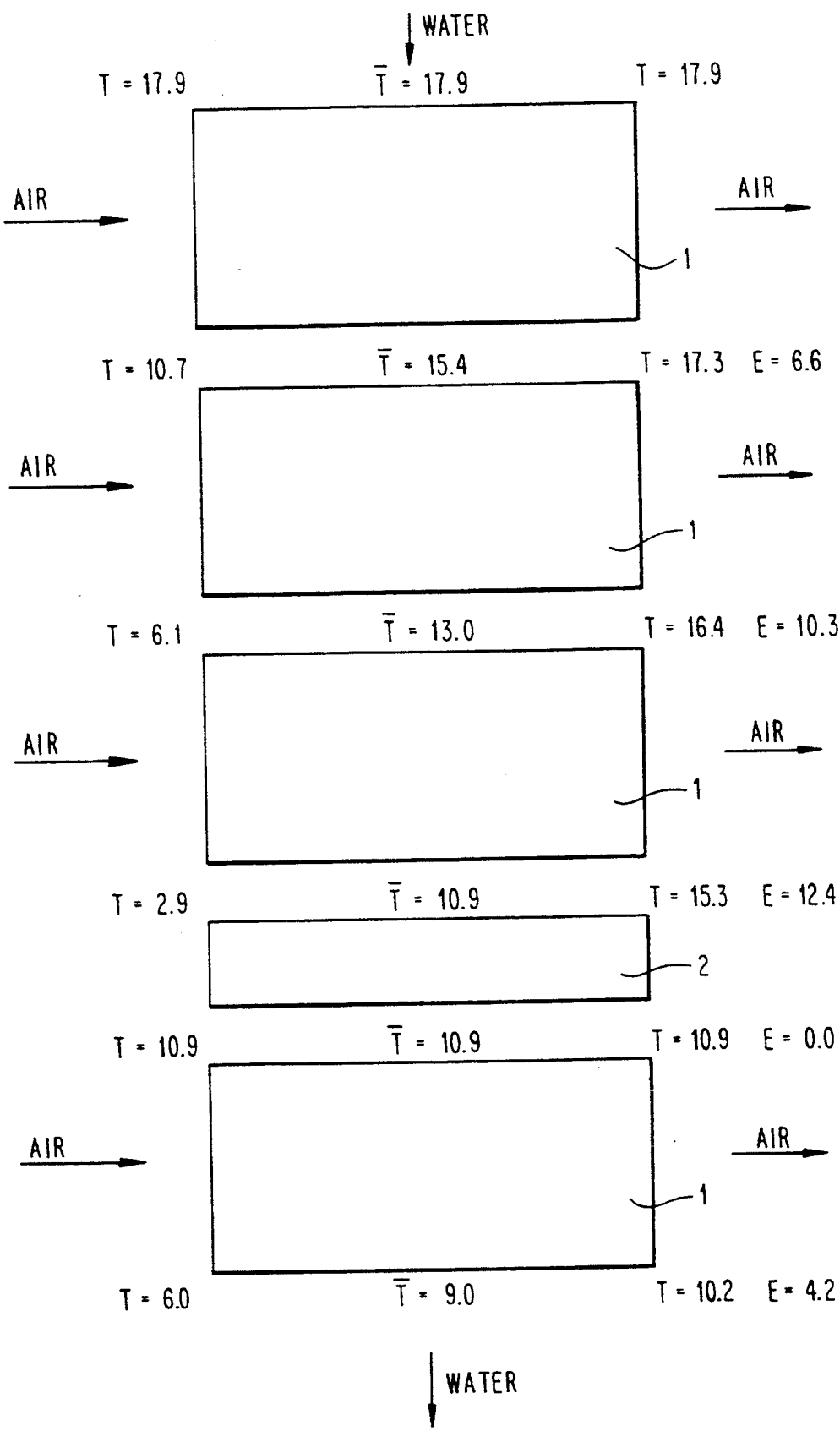
FIGS. 3 and 4 are similar views of FIG. 1, with one or two water recycling tanks interposed, depending on the circumstances.
Figure 4:
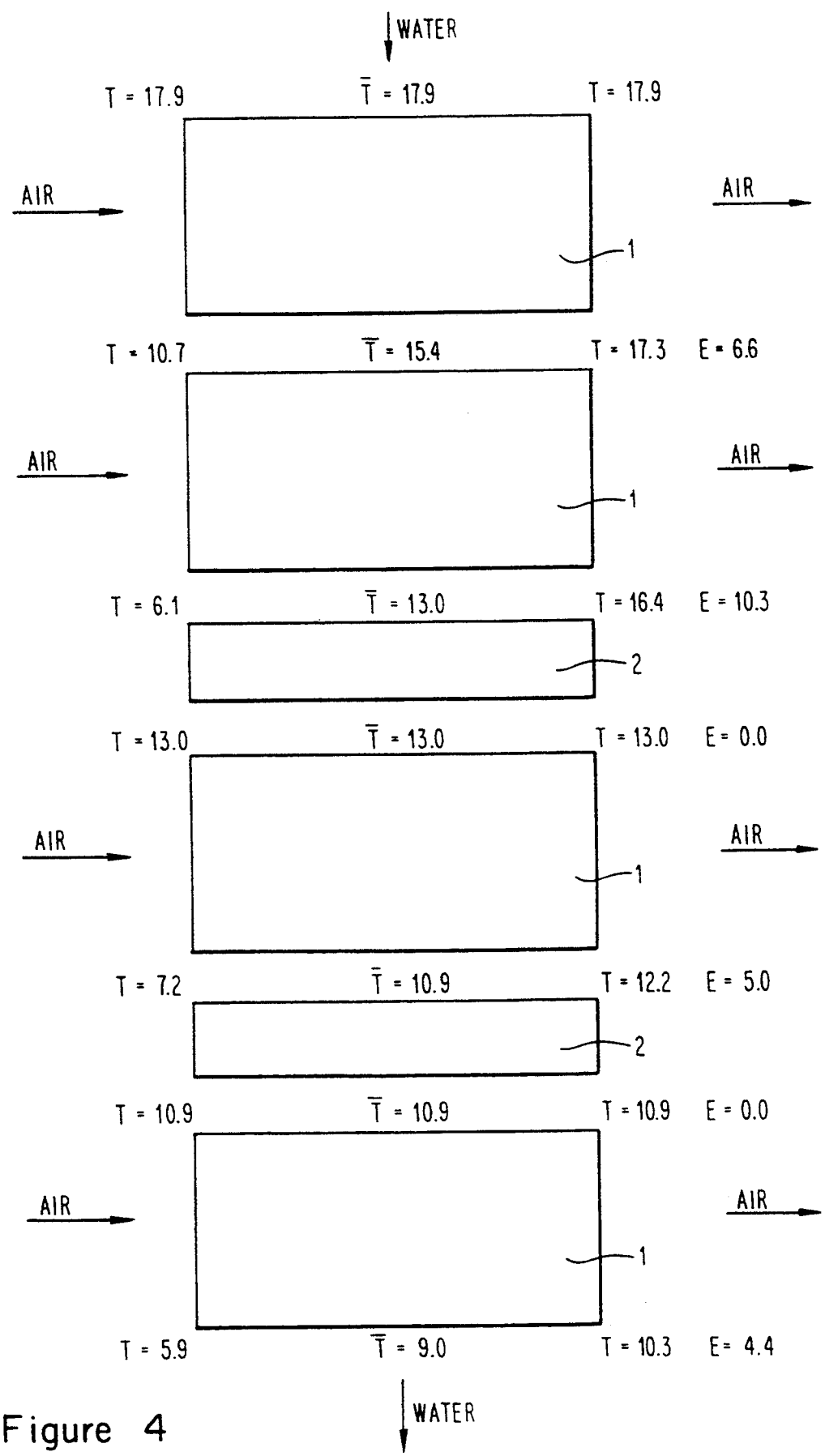

FIG. 3 represents an arrangement similar to that in FIG. 1, but with a redistributing tank 2 for the water interposed between the ultimate and penultimate tiers of the exchanger. FIG. 4 represents a similar arrangement, but this time with two distributing tanks 2 interposed, one common to FIG. 3 and the other sited between the penultimate and the antepenultimate tier.

It will be noted that the temperature of the water at the foot of the final tier at the front is now considerably higher (5.9° to 6.0° C.) than it is without a water redistribution tank (0.7° C.).

It will also be noted that the fact of adding a tank to the configuration shown in FIG. 3 does not, in practical terms, alter the front-to-rear temperature differences at the foot of the final tier, but does substantially increase the temperature at the foot of the penultimate tier at the front (7.2° C. with two water redistributing tanks instead of 2.9 with a single redistributing tank).

In practice, the length of the device will be matched to the depth of the exchanger, whereas its breadth will be matched to a unit of the cooler's substructure, for example 2.0 m. The redistributing tank will for example have a length of 1.9 m if it is wished to interpose it between the posts of the substructure.

The material used for the elements of the water redistributing device may for example be metal or plywood or rigid synthetic organopolymers, reinforced with glass fibres if appropriate.

The intermediate bottom may, if appropriate, be removable so as to allow it to be dispensed with during the period of the year when there is no danger of freezing, if it is desired to avoid the disruption to the mean temperature of the cold water produced by reducing variation of the temperature at intermediate levels of the waterfall.

The spillway may be sited at the front or rear of the intermediate bottom. In the former case, the intermediate bottom would then be joined in leakproof manner to the back wall and not to the front wall of the tank 2.

The invention, illustrated here with respect to droplet-type or film-type cross-flow exchangers, is equally applicable to mixed film and droplet-type cross-flow exchangers.

I claim:

1. Device for reducing variation in the temperature of a liquid in a tower cooler designed to cool, by direct contact with the atmospheric air, a liquid falling under the effects of gravity through at least two vertically extending exchanges through which an atmospheric airflow passes approximately horizontally comprising means, provided beneath a first exchanger, for effecting substantially homogeneous agitation or mixing of the liquid before it passes into the following exchanger, consisting of a tank with a pierced bottom and an intermediate bottom which divides the tank into two compartments arranged one above the other, the compartments being interconnected by an opening, wherein the intermediate bottom separates the lower and upper compartments in leakproof manner, except for one extreme edge which forms a spillway delimiting the opening with the side walls and an end wall of the tank.

2. A device according to claim 1, wherein there is a first compartment sited beneath the first exchanger so as to receive the liquid falling from said first exchanger, a spillway provided at one end of said compartment such that the liquid is displaced therein in a first direction, which is either that of the airflow or the reverse direction, a second compartment placed beneath the first compartment and communicating therewith via the spillway, such that the liquid is displaced therein in a second direction opposite to the first, and means for discharging liquid from the second compartment towards the following exchanger.

3. A device according to claim 1, characterized in that the pierced bottom is pierced by calibrated nozzles.

4. A device according to claim 2, wherein the spillway is sited at the requisite end of the tank so that the liquid to be cooled flows in the same direction as the airflow passing through the exchanger.

5. A device according to claim 2, wherein the spillway is sited at the requisite end of the tank so that the liquid to be cooled flows in the opposite direction to the airflow passing through the exchanger.

* * * * *